(12) United States Patent
Schultheis et al.

(10) Patent No.: US 6,821,628 B2
(45) Date of Patent: *Nov. 23, 2004

(54) GLASS-CERAMIC COOKING PANEL THAT MAKES DEPOSITED MATERIAL, SUCH AS DIRT, LESS CONSPICUOUS

(75) Inventors: Bernd Schultheis, Schwabenheim (DE); Waldemar Weinberg, Seibersbach (DE); Monica Cotlear De Witzmann, Nieder-Olm (DE); Roland Dudek, Bad Kreuznach (DE); Friedrich Siebers, Nierstein (DE); Klaus Schoenberger, Mainz (DE)

(73) Assignee: Schott Glas, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/456,661

(22) Filed: Dec. 9, 1999

(65) Prior Publication Data

US 2002/0058117 A1 May 16, 2002

(30) Foreign Application Priority Data

Dec. 10, 1998 (DE) .......................................... 198 57 117

(51) Int. Cl.$^7$ .............................. B32B 17/06; B32B 3/02
(52) U.S. Cl. ...................... 428/426; 428/64.1; 428/210; 501/4; 501/6; 501/7; 501/68; 501/69; 501/70; 501/71; 501/5; 501/63; 501/64; 501/14; 501/18; 501/21; 501/22; 501/23
(58) Field of Search ................................ 428/64.1, 210, 428/426; 501/4, 6, 7, 68, 69, 70, 71, 5, 63, 64, 14, 18, 21, 22, 23

(56) References Cited

U.S. PATENT DOCUMENTS

| | | | |
|---|---|---|---|
| 3,582,371 A | | 6/1971 | Bruno |
| 3,830,216 A | * | 8/1974 | Dodd ........................ 126/39 J |
| 3,834,981 A | * | 9/1974 | Grossman et al. |
| 4,011,091 A | * | 3/1977 | McCollister |
| 4,461,839 A | | 7/1984 | Ritter |
| 4,526,872 A | | 7/1985 | Andrieu et al. |
| 5,057,018 A | * | 10/1991 | Bowen |
| 5,070,045 A | | 12/1991 | Comte et al. |
| 5,446,008 A | | 8/1995 | Krolla et al. |
| 5,491,115 A | | 2/1996 | Pfitzenmaier et al. |
| 5,492,869 A | | 2/1996 | Beall et al. |
| 6,043,171 A | * | 3/2000 | Siebers et al. ................. 501/66 |
| 6,515,263 B2 | * | 2/2003 | Mitra et al. ............... 219/443.1 |

FOREIGN PATENT DOCUMENTS

| | | |
|---|---|---|
| DE | 43 33 334 A1 | 4/1995 |
| DE | 43 21 373 C2 | 12/1995 |
| DE | 197 21 737 C1 | 11/1998 |
| EP | 0 220 333 B1 | 3/1990 |
| EP | 0 437 228 B1 | 11/1994 |
| EP | 1 029 830 A1 | 8/2000 |

OTHER PUBLICATIONS

"High–Quartz Solid Solution Phases From Thermally Crystallized . . . " by Satyabrata, et al, in Journal of the American Ceramic Society, Vo. 51, No. 12, Dec. 1968, pp. 678–682.
"Thermal Expansion of Synthetic B–Spondumene . . . " by W. Ostertag, et al, in Journal of the American Ceramic Society, vol. 51, No. 11, Nov. 1968, pp. 651654.
"Hoehere Farbmetrik ", Das Cielab–System, L,A,B–Koordinaten, Printout From http://farbmetrik-gall.de/FM3$_{13}$ 1.html, 4 pages.
"Industrial Applications of Silica" by G. H. Beall, Corning Incorporated, New York, pp. 469–505.
Compositions—Printout from http://www.rose-hulman.edu/class/c . . . materials/corming/composition.htm.
Color Models Cielab, Printout from http://www.adobe.com . . . ides/color/colormodels/cielab.htm., 1 page.
Cielab, Printout from http://www.limocolor.com/colorman/sp_ciela_11.htm, 2 pages.
Cielab, Cielab Color Space, Printout from http://www.limocolor.com/colorman/sp_ciela_11.htm, 4 pages.

* cited by examiner

Primary Examiner—Terrel Morris
Assistant Examiner—Hai Vo
(74) Attorney, Agent, or Firm—Michael J. Striker

(57) ABSTRACT

The cooking panel is made from an opaque glass-ceramic material uniformly colored throughout and having keatite mixed crystals as the predominant crystalline phase. The cooking panel is made by ceramicizing a ceramicizable glass or a transparent glass-ceramic with high quartz mixed crystals as the predominant crystalline phase in a definite color location range with a brightness parameter value (L*) less than 85 and a color shade and chromaticity according to its later service and wear pattern. The cooking panel makes deposited material, such as dirt and the like, less conspicuous.

7 Claims, No Drawings

GLASS-CERAMIC COOKING PANEL THAT MAKES DEPOSITED MATERIAL, SUCH AS DIRT, LESS CONSPICUOUS

BACKGROUND OF THE INVENTION

1. Field of the Invention

The subject matter of the present invention includes a glass-ceramic cooking panel made from an opaque, uniformly colored glass-ceramic material with keatite mixed crystals as the predominant crystalline phase. The cooking panel the invention has an improved less-soiled appearance when deposited material, such as dirt and the like, is present on it.

2. Prior Art

Transparent uniformly colored glass-ceramic cooking panels, which appear dark to black, are known and have already been on the market for a comparatively long time.

When decorative light printed colors are desired on these cooking panels, it is necessary to print the entire surface to provide those decorative bright colors. These printed colors are sensitive in use, because any change of a light color is conspicuous. Also most decorative colors soon have a pale and less intense appearance because of their reduced layer thickness of typically 1 $\mu$m to 10$\mu$m.

Also opaque, white glass-ceramic molded bodies for use as cooking panels are known, e.g. from NEG, Japan, and are marketed under the trade name NEOCERAM® N11. They are currently used exclusively in induction cooking units. A colored glass-ceramic made from a glass starting material based on the $Li_2$—$Al_2O$—$SiO_2$ is known from U.S. Pat. No. 5,491,115, with $\beta$-Quartz and $\beta$-spodumene mixed crystals as the principal crystalline phase. The colored substance contained in this glass-ceramic is up to 6 percent by weight $TiO_2$. The nuclei formers included in this glass-ceramic are from 700 to 900 ppm $Fe_2O_3$ and 500 to 3000 ppm $Co_3O_4$. This glass-ceramic is transparent according to which crystalline phase is dominant. If $\beta$-Quartz is the principal crystalline phase, the glass-ceramic is transparent. If $\beta$-spodumene mixed crystals are the principal crystalline phase, then the glass-ceramic is opaque and has accordingly a certain definite color location.

U.S. Pat. 5,492,869 similarly has an opaque so-called LAS- ($Li_2O$—$Al_2O$—$SiO_2$) glass-ceramic material, with $\beta$-spodumene as the main crystalline phase and 1500 to 4000 ppm $CeO_2$, 1500 to 4000 ppm $Fe_2O_3$ and 50 to 500 ppm $V_2O_5$ as coloring substances and with a color location in the CIE system of x=0.3200–0.3330, y=0.3265–0.3380 and Y=40–70. This patent recommends the use of this type of glass-ceramic material in cooking utensils, baking molds or dishes, cooking vessels and flat cooking surfaces. Its purpose is to provide suitable coloring substances in order to produce glass-ceramic articles containing $\beta$-spodumene mixed crystals and having a pleasing beige color.

U.S. Pat. 4,461,839 discloses a transparent, translucent or opaque glass-ceramic article with colors from black through brown and to red with $\beta$-Quartz mixed crystals as the principal phase whose composition (in percent by weight based on the oxide content) is as follows: $SiO_2$, 63.5–69; $Al_2O_3$, 15–25; $Li_2O$, 2.5–4; $Na_2O$, 0.1–0.6; $K_2O$, 0.1–0.6; ZnO, 0–2; BaO, 0–5; $TiO_2$, 2.5–6; $ZrO_2$, 0–2; $As_2O_3$, 0.4–0.8; $Fe_2O_3$, 0.05–0.2 and free of MgO. The composition also contains 0.3 to 3 percent by weight of at least two of the oxides CaO, $CeO_2$, NiO, $SnO_2$, $V_2O_5$ and $WO_3$. When included in the composition, these latter ingredients are present in the following concentration ranges: CaO, 0–2; $CeO_2$, 0–3; NiO, 0–1; $SnO_2$, 0–1.5; $V_2O_5$, 0–0.3 and $WO_3$, 0–1.

This U.S. Patent also discloses opaque glass-ceramic articles having $\beta$-spodumene mixed crystals with gray, brown, almond, beige, yellow to blue colors and compositions whose compositions are identical with the above-mentioned glass-ceramic articles.

Examples for applications of this type of colored glass-ceramic material include chimney or flue viewing glass, and all other articles in flat form, e.g. working panels and cooking panels.

German Patent DE 43 21 373 C2 discloses a glass-ceramic material with high quartz (h-quartz) and/or keatite mixed crystals as the essential crystalline phase. This glass-ceramic material has a water content of less than 0.03 mole/l and an adjustable transmission of more than 10% for a 3 mm thick body in the entire wavelength range between 2700 and 3300 nm.

In all these glass-ceramic molded bodies, especially those which are used as cooking panels, it is disadvantageous that they "show the dirt" or are susceptible to having a conspicuously soiled appearance, because of the phenomenon that cracks necessarily formed during usage in the upper surface of the molded body catch the dirt, overflowing cooking materials and cleaning agent residues.

SUMMARY OF THE INVENTION

It is an object of the present invention to provide a cooking panel made from an opaque uniformly colored glass-ceramic material with keatite mixed crystals as the predominant crystalline phase, which makes deposited and/or adhering material, such as dirt and the like, less conspicuous soiling, considering its later service and wear pattern.

Furthermore both ceramicized glass, the so-called green glass, and also already ceramicized glass-ceramic material with a high quartz mixed crystals as the dominant crystalline phase can be used.

This object is attained with a cooking panel made from an opaque uniformly colored glass-ceramic material with keatite mixed crystals as the predominant crystalline phase, which is ceramicized a ceramicizable glass in a color location range in the L*a*b* color system (CIELAB system) with a brightness value L*<85.

This object is also attained with a cooking panel made from an opaque uniformly colored glass-ceramic material with keatite mixed crystals as the predominant crystalline phase, which is made by ceramicizing with a transparent glass-ceramic material having high quartz mixed crystals as the predominant crystalline phase in a color location range in the L*a*b* color system (CIELAB system) with a brightness parameter value L*<85.

This feature provides the advantage that it is possible to color a cooking panel made from glass-ceramic material that has a reduced susceptibility to show the dirt or to have conspicuous soiling according to its later application and wear pattern.

The cooking panel made from opaque glass-ceramic material according to the invention can be colored so that it has a reduced susceptibility to show the dirt or to have conspicuous soiling according to its later application and wear pattern.

Both transparent and also opaque cooking panels, which differ only be additional temperature treatment, can be made form a glass melt. Small imperfections within the transparent glass-ceramic material, e.g. small bubbles or streaks, which would eventually cause interference in the transparent modification, are no longer visible in the opaque state after this additional temperature treatment.

In a preferred embodiment of the invention the color of the cooking panel is between dark gray and light gray. The color shade parameter $C^*$ ($C^*=\{(a^*)^2+(b^*)^2\}^{1/2}$) in the $L^*C^*h$ color system (CIELAB System) is set or fixed $C^* \leq 10$. The parameters $a^*$ and $b^*$ are also color shade parameters.

Cooking panels whose colors are between dark gray and light gray may be made by ceramicizing glasses (green glass) described in European Patent EP 0 220 333 B1 to make a transparent glass-ceramic containing high quartz mixed crystals or by additionally ceramicizing the transparent glass-ceramic material having the following composition (in percent by weight): $SiO_2$, 62–68; $Al_2O_3$, 19.5–22.5; $Li_2O$, 3.0–4.0; $Na_2O$, 0–1.0; $K_2O$, 0–1.0; $BaO$, 1.5–3.5; $CaO$, 0–1.0; $MgO$, 0–0.5; $ZnO$, 0.5–2.5; $TiO_2$, 1.5–5.0; $ZrO_2$, 0–3.0; $MnO_2$, 0–0.4; $Fe_2O_3$, 0–0.2; $CoO$, 0–0.30; $NiO$, 0–0.30; $V_2O_5$, 0–0.80; $Cr_2O_3$, 0–0.20; $F$, 0–0.20; $Sb_2O_3$, 0–2.0 and $As_2O_3$, 0–2.0. Furthermore the total amount $Na_2O+K_2O$ in the glass-ceramic material should be between 0.5 and 1.5; the total amount of $BaO+CaO$, between 1.5 and 4.0; the total amount of $TiO_2$ and $ZrO_2$, between 3.5 and 5.5; and the total amount of $Sb_2O_3$ and $As_2O_3$, between 0.5 and 2.5.

Besides the glass composition itself the heat treatment of the glass-ceramic material has a substantial effect on the color location obtainable. Typically the heat treatment occurs—the ceramicizing of the ceramicizable glass or the further ceramicizing of the transparent glass-ceramic material—in a temperature range of from 950° to 1150° C. This is also true for the glass composition described in EP 0 220 333 B1, the higher the temperature the brighter or lighter the color shade.

A cooking panel made from opaque uniformly colored glass-ceramic material and adjusted to the color of the dirt or soiling material can be obtained according to the type and especially the color of the dirt or soiling material expected. Besides the glass composition the heat treatment of the cooking panel is essential.

It has been shown that the cooking panel made from opaque glass-ceramic material uniformly colored throughout its bulk whose color shade lies in the above-preferred color location range, between dark grey and light gray or between blue and blue-gray, not only shows accumulated dirt or soiling material less for a number of applications, but also wear marks, such as scratches, are clearly less visible in comparison to, for example, pure white or black cooking panels.

In an additional preferred embodiment of the invention the color of the cooking panel is between dark gray and light gray. The color parameter $C^*$ ($C^*=\{(a^*)^2+(b^*)^2\}^{1/2}$) in the $L^*C^*h$ color system (CIELAB System) is fixed by $C^* > 10$.

Thus it is possible to make a cooking panel with a definite color parameter, which has nearly identical color location for respective service and wear patterns. That means that the cooking panel has nearly the same color location as the dirt or soiling material that is expected to collect on it.

The cooking panel according to the invention can be completely colored throughout and/or partially decorated. For example, glass compositions as described in German Patent DE 197 21 737 C1 are especially suitable for decoration.

Furthermore the invention is not limited to flat cooking panels, but also spherical or cylindrical curved cooking panels can be formed according to the present invention and/or can have regions varying in height from the main plane of the cooking surface. This latter structure for a cooking panel is known in the prior art and described, for example, in German Patent Application DE 43 33 334 A1.

For the first time it is possible to obtain a cooking panel with an arbitrarily defined color location according to its later service and wear pattern.

It has been shown that these cooking surfaces make dirt deposits and various soiling materials less conspicuous and also wear marks, such as scratches, clearly less visible.

Furthermore it is also possible to define for example individual cooking zones by decoration of the cooking panel in the respective complementary colors.

The cooking panel according to the invention do not differ among themselves in a number of their physical properties or only slightly from the already known molded bodies made from opaque glass-ceramic material. Thus they can be used in cooking systems that have high temperature resistance of up to 700° C.

By means of the invention it is possible to obtain a cooking panel made of opaque uniformly colored glass-ceramic material with keatite mixed crystals as the predominant crystalline phase, which is ceramicized in a predetermined definite color location and makes deposited material, such as dirt and other soiling materials, present on it, less conspicuous, according to its later service and wear pattern. Both ceramicizable glass and also already ceramicized glass-ceramic material with high quartz mixed crystals as predominant crystalline phase can advantageously be used.

The disclosure in German Patent Application 198 57 117.8-45 of Dec. 10, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a glass-ceramic cooking panel that makes deposited and/or adhering matter, such as dirt and the like, less conspicuous, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

We claim:

1. A cooking panel consisting of an opaque glass-ceramic material, said opaque glass-ceramic material being uniformly colored throughout and having keatite mixed crystals as the predominant crystalline phase, wherein said cooking panel is made by ceramicizing a transparent colored glass-ceramic material having high quartz mixed crystals as the predominant crystalline phase to form the cooking panel with a color in a color location range in the $L^*a^*b^*$ color system with a brightness parameter value ($L^*$) less than 85 and with a color shade and chromaticity in the $L^*C^*h$ color system; wherein said color location range of said cooking panel is at least approximately in a color location range of accumulated soiling material and dirt to be expected on said cooking panel for respective service and wear patterns;

wherein said transparent glass-ceramic material has the following composition (in percent by weight): $SiO_2$, 62 to 68; $Al_2O_3$, 19.5 to 22.5; $Li_2O$, 3.0 to 4.0; $Na_2O$, 0 to 1.0; $K_2O$, 0 to 1.0; BaO, 1.5 to 3.5; CaO, 0 to 1.0; MgO, 0 to 0.5; ZnO, 0.5 to 2.5; $TiO_2$, 1.5 to 5.0; $ZrO_2$, 0 to 3.0; $MnO_2$, 0 to 0.4; $Fe_2O_3$, 0 to 0.2; CoO, 0 to 0.30; NiO, 0 to 0.30; $V_2O_5$, 0 to 0.80; $Cr_2O_3$, 0 to 0.20; F, 0 to 0.20; $Sb_2O_3$, 0 to 2.0 and $As_2O_3$, 0 to 2.0;

wherein a total amount of said $Na_2O$+ said $K_2O$ is between 0.5 and 1.5; a total amount of said BaO+ said CaO is between 1.5 and 4.0; a total amount of said $TiO_2$ and said $ZrO_2$ is between 3.5 and 5.5 and a total amount of said $Sb_2O_3$ and said $As_2O_3$ is 0.5 and 2.5; whereby soiling and wear are less conspicuous.

2. The cooking panel as defined in claim 1, wherein said color is between dark gray and light gray and said chromaticity (C*) in the L*C*h color system is fixed by $C^* \leq 10$, wherein $C^* = \{(a^*)^2 + (b^*)^2\}^{1/2}$.

3. The cooking panel as defined in claim 1, wherein said color shade and said chromaticity (C*) in the L*C*h color system are fixed by $C^* > 10$, wherein $C^* = \{(a^*)^2 + (b^*)^2\}^{1/2}$.

4. The cooking panel as defined in claim 3, wherein said color shade is blue or blue-gray.

5. The cooking panel as defined in claim 1, further comprising a decoration.

6. The cooking panel as defined in claim 1, having a planar, spherical or cylindrical curved shape.

7. The cooking panel as defined in claim 1, having regions of differing height including a principal planar part.

* * * * *